United States Patent [19]

Perotti et al.

[11] 4,303,257
[45] Dec. 1, 1981

[54] STEERING MECHANISM FOR BICYCLES, MOTORCYCLES AND THE LIKE

[76] Inventors: Dino Perotti; Mario Perotti, both of via Gozzano 3, Sarezzo, Brescia, Italy

[21] Appl. No.: 43,345

[22] Filed: May 29, 1979

[30] Foreign Application Priority Data

Dec. 22, 1978 [IT] Italy .................................. 5289 A/78

[51] Int. Cl.³ ............................................. B62K 21/04
[52] U.S. Cl. ................................ 280/279; 308/207 A; 308/227
[58] Field of Search ................................ 280/279, 280; 308/207 R, 207 A, 210, 216, 236, 222, 231, 237 A, 227

[56] References Cited

U.S. PATENT DOCUMENTS

| | | | |
|---|---|---|---|
| 1,511,480 | 10/1924 | Knoivles | 308/196 X |
| 3,275,391 | 9/1966 | Blais | 308/174 |
| 3,967,867 | 7/1976 | Richardson | 308/207 R |
| 4,189,167 | 2/1980 | Dubois | 280/279 |

Primary Examiner—Joseph F. Peters, Jr.
Assistant Examiner—Randall A. Schrecengost

[57] ABSTRACT

In a steering mechanism for bicycles, motorcycles or the like a plurality of cylindrical rollers are positioned between an inner and an outer race which are attached, respectively, to the stationary part and the rotatable cylinder of the steering mechanism. The rollers are inclined in opposite directions wth respect to the axis of the steering mechanism.

7 Claims, 3 Drawing Figures

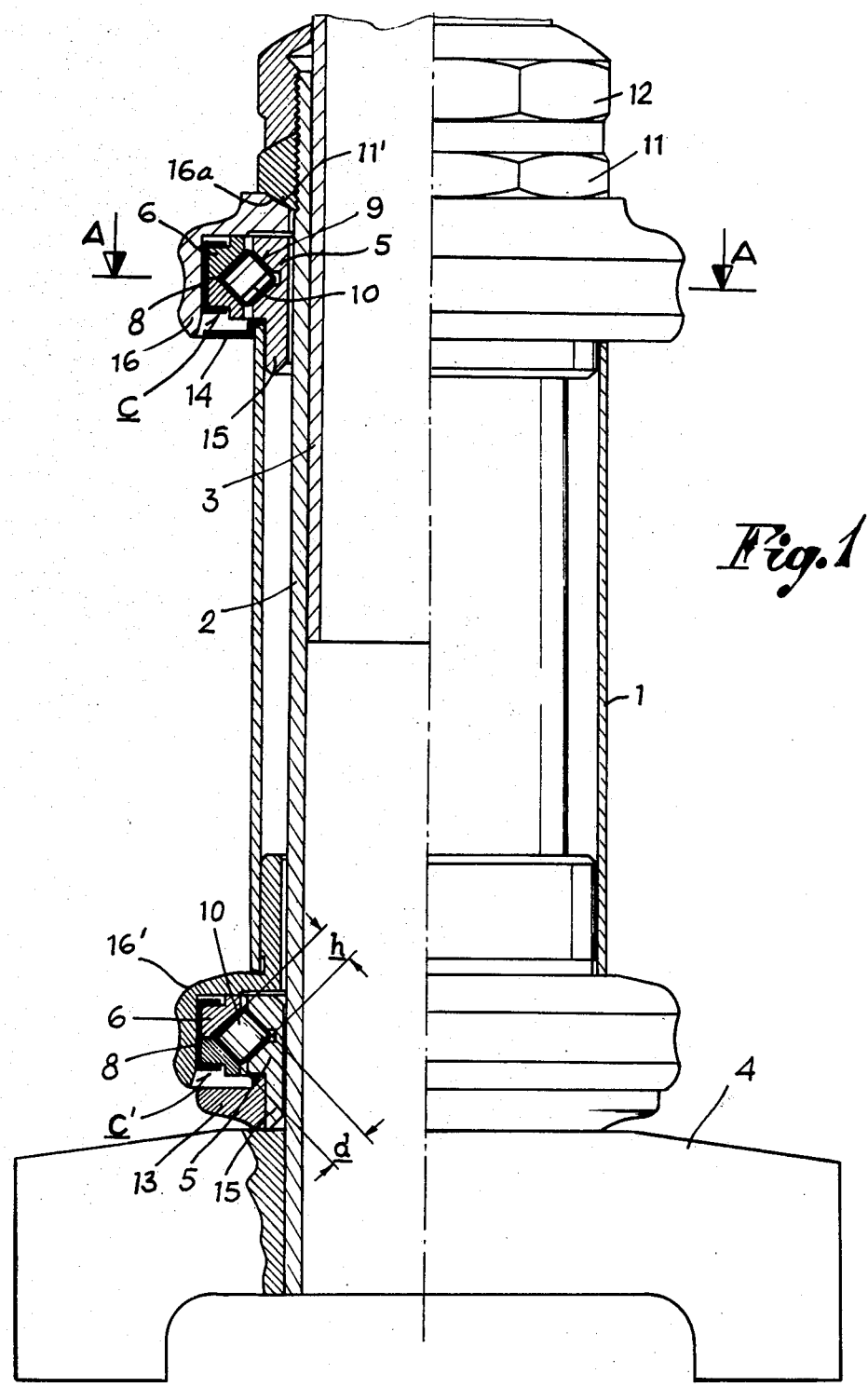

STEERING MECHANISM FOR BICYCLES, MOTORCYCLES AND THE LIKE

The present invention relates generally to improvements in steering mechanisms for bicycles, motorcycles and the like. More particularly, the present invention relates to steering mechanisms which comprise a tubular portion or steering stem which forms an integral part of the frame, in which frame there is rotationally positioned, by means of anti-friction rolling means, the cylinder which connects the handlebar to the fork of the forward wheel of the vehicle to be steered.

In the known types of steering mechanisms, the anti-friction rolling means consist generally of a plurality of spheres positioned between two annular elements. These elements having cap-like surfaces, opposed to each other and enclosing therebetween the spheres themselves. These annular elements rotate with respect to each other. The spheres are mounted either freely between the two cap-like surfaces or are positioned by means of a guiding and positioning cage.

Such an arrangement however presents disadvantages which are considerable. These disadvantages are caused by an intense wearing of the cap-like surfaces due to the rolling of the spheres thereagainst, so that, as time passes, an unacceptable play is created in the steering mechanism. This play cannot be corrected by conventional tightening and adjustment of the reciprocal position of the two annular elements. Hence, the necessity of changing the rolling means in order to restore the original steering ability and condition of the mechanism itself.

In an attempt to eliminate these inconveniences, it has been suggested, however without particular success, to employ conventional ball-bearings appropriately mounted between the mobile portion and the fixed portion of the steering mechanism.

It is therefore an object of the present invention to provide a steering mechanism in which the rolling anti-friction means consist of cylindrical rollers positioned between an inner guiding race and an outer guiding race, both races being attached respectively to the stationary part and to the rotatable cylinder of the steering mechanism. These rollers are inclined in opposite directions between the two races and with respect to the axis of the steering mechanism.

It is another object of the present invention to provide a steering mechanism with an improved mounting which permits the employment of the above-mentioned rolling anti-friction means in order to reduce the wear and tear of the component parts of the steering mechanism and permit the adjustment, in an axial direction between the two guiding races of the rollers, so as to enable the operator to correct and eliminate eventual play derived by the continuous usage of the steering mechanism.

A practical example of the realization of the invention will be described hereinafter in greater detail, with reference to the accompanying drawings which are merely illustrative and not limitative of the invention, and in which:

FIG. 1 shows an assembled steering mechanism, partially in longitudinal section;

The steering mechanism comprises, in a manner conventionally known, a tubular portion 1 constituting an integral part of the frame (not shown) of the bicycle, motorcycle or the like. In the frame there extends the cylinder 2, attached on one end and telescopically adjustable with respect to the stem 3 of the handlebar (not shown) of the vehicle and, at the other end to the fork 4 of the wheel to be steered.

Figure 3:
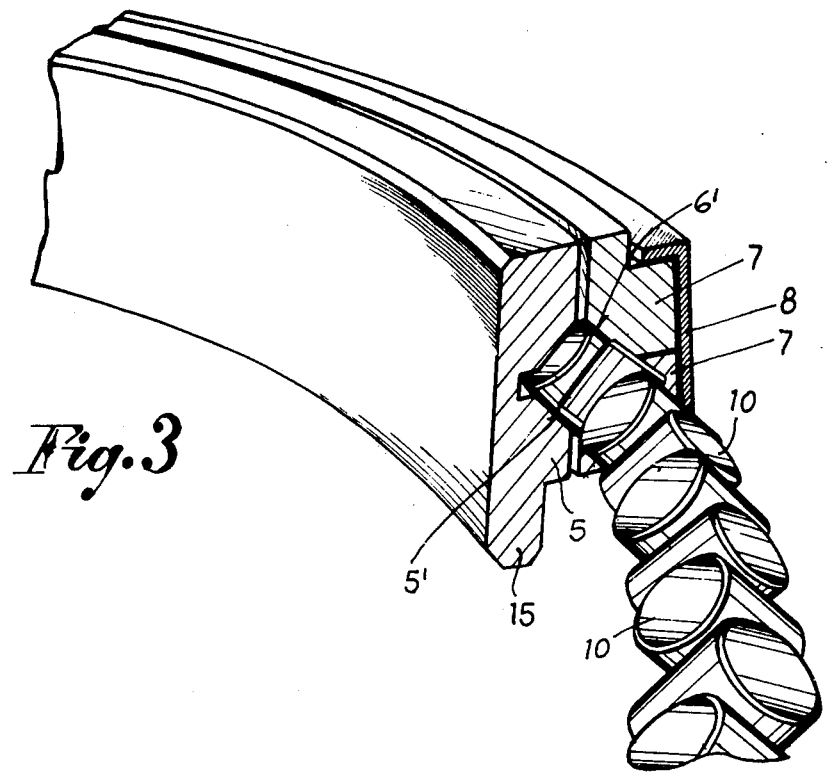
FIG. 3 is a perspective view of a portion of the sole bearing component of the mechanism.

In accordance with the invention, between the tubular portion 1 and the cylinder 2, there are interposed two axially spaced apart bearing assemblies or rolling, anti-friction means C—C', one of them being upper with respect to the other. Each of the rolling, anti-friction means C—C' comprises an inner race 5 and an outer race 6, which are concentric and are provided with a V-shaped throat 5' and 6' (FIG. 3), the throat of one race being opposed to the throat of the other race and being defined by two surfaces which are perpendicular to one another but which are inclined with respect to the axis of the races 5 and 6. The inclination is preferably, but not necessarily, 45°.

For reasons of construction and of assembly, the outer race 6 is formed of two angular elements 7, which are superimposed on each other and are attached to each other by means of a peripheral band 8, the edges of which are folded onto the opposed heads of the angular elements 7.

Figure 2:
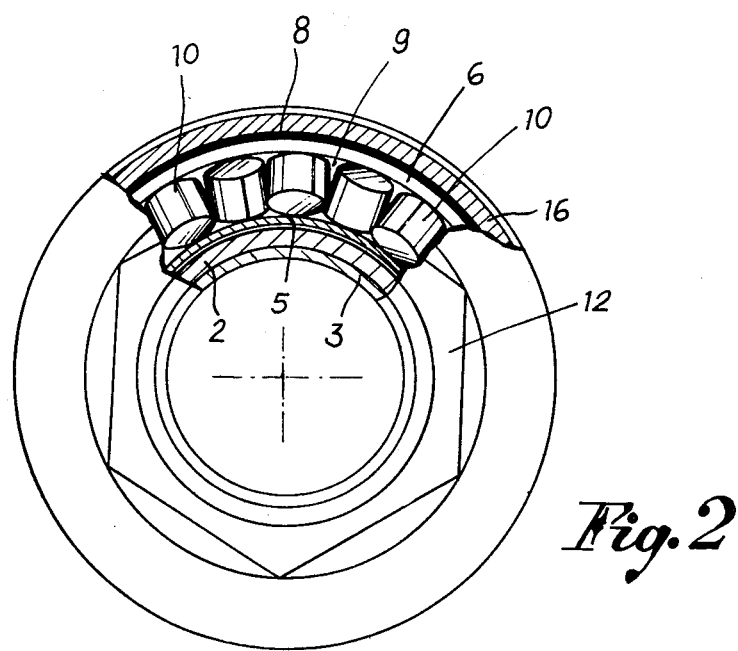
FIG. 2 is a partial sectional view along arrows A—A of FIG. 1.

The opposed throats 5' and 6' of the inner and outer races 5 and 6 define, in combination, an annular groove 9, having a square cross-section and surfaces which are parallel in pairs and opposite in pairs, the surfaces being defined by the surfaces of the throats 5' and 6'. In the groove 9 are positioned cylindrical rollers 10 oriented in such a manner as to be inclined in opposite directions, as shown in detail in FIG. 2, in such a way that the axis of one roller 10 is perpendicular to the axes of the two adjacent rollers 10, all of the axes of the rollers 10 being inclined with respect to the axis of the races 5 and 6 by an angle corresponding to the angle of the surfaces of the groove 9, that is 45°.

The cylindrical rollers 10 each have a diameter d which is at least slightly greater than the height h of the roller itself and, because of the mounting or assembly described hereinabove, while one roller 10 rolls on two opposite surfaces of the groove 9 the roller 10 which immediately follows it rolls on the other two surfaces of the groove 9 which are opposed thereto, while obviously the head of the rollers 10 are facing accordingly without however ever interfering with the rolling surfaces.

The inner race 5 of each of the rolling means C—C' is provided with an axial extension 15, while the outer race 6 is positioned forcedly and thus is fixed in supporting elements 16—16'.

More precisely, and as shown in FIG. 1, in order to assemble the steering mechanism, the inner race 5 of the upper rolling means C is mounted on the upper extremity of the tubular portion 1 by means of a forced seating of the axial extension 15 of the ring in the tubular portion so as to become integral with the portion 1.

On the other hand, the outer race 6 of the upper rolling means C is fixed by means of the supporting element 16 and by means of a closing nut 11 and of a counter nut 12, to the cylinder 2 of the steerage for the fork 4, so as to rotate together therewith.

Conversely, the inner race 5 of the lower rolling means C' is attached to the cylinder 2 so as to rotate therewith and is coupled to a dust shielding element 13 while the outer race 6 is associated, by means of its respective element 16', to the tubular portion 1 so as to become integral therewith.

Because of the mounting described hereabove, the movements of the components of the steering mechanism are guided on two pluralities of cylindrical rollers. The particular coupling thereof with the guiding races 5 and 6 enables the operator to cause the rolling of the rollers on all the surfaces of the respective annular grooves 9, so that the loads are more uniformly distributed on the surfaces, reduce the wearing thereof and insure a more correct and constant behavior of the steering mechanism.

In order to correct the play caused by wearing of the steering mechanism, the closing nut 11 is rotated so that it advances in a downward direction to thereby cause axial displacement of the supporting element 16 of the bearing assembly C in the downward direction as well. Since the outer race 6 of the upper bearing assembly is rigidly coupled to the supporting element 16, it too will move axially downward to thereby close the throat that is formed between the inner and outer races 5 and 6, respectively. As described hereinbefore, the tubular portion 1 which is rigidly coupled at its lower end to the lower supporting element 16' is used to axially displace the lower outer race 6 in a axially downward direction. This effectively closes the throat formed between the inner and outer races 5 and 6, respectively in the lower bearing assembly C'.

As the tubular portion 1, in combination with the lower supporting elements 16' is used to move the lower outer race 6 in an axially downward direction, the upper, inner race 5, which is rigidly coupled to the upper end to the tubular portion 1 will also move downwardly and will thereby open the throat formed between the upper, inner and outer races 5 and 6, respectively. However, this can be very easily corrected merely by rotating the closing nut 11 once again so that the upper, outer race 6 again moves in an axially downward direction. Of course, if it is known that the play has occured in both the upper and lower bearing assemblies, then the lower bearing assembly would be corrected first so as to obviate the need for adjusting the upper bearing assembly twice.

It is to be noted finally that to the upper rolling means C as well as to the lower rolling means C', there may be associated a dust-shielding element 14 and that, in order to compensate for the eventual irregularities of threading of the cylinder of the steering mechanism, the surfaces 11' and 16' of the closing nut 11 and, respectively, of the supporting element 16 in contact therebetween may be advantageously provided with a spherical movement or displacement or motion as represented in FIG. 1.

We claim:

1. A steering mechanism for bicycles, motorcycles and the like, comprising a tubular portion integral with the frame of the vehicle, and a cylinder extending coaxially in said tubular portion and telescopically attached on one end to the extension of the handlebar and at the other end to the fork of the wheel to be steered, between said tubular portion and said cylinder there being interposed two axially spaced apart, upper and lower bearing assemblies each comprising concentric, inner and outer races defining therebetween an annular groove having a square cross section, in said groove there being seated and guided a plurality of cylindrical rollers that are alternately inclined in opposite directions to thereby result in pairs of said cylindrical rollers positioned perpendicular to one another and inclined with respect to the axis of the steering mechanism, said inner race of each said bearing assembly being provided with an axial extension the upper one of which is coupled to said tubular portion and the lower one of which is coupled to said cylinder, while said outer race of each said bearing assembly is forcedly seated and coupled to upper and lower supporting elements, the upper one of which is coupled to said cylinder and the lower one of which is coupled to said tubular portion.

2. The steering mechanism according to claim 1, wherein said outer races of said two bearing assemblies are adjustably positioned with respect to said inner races, said adjustment being obtained by means of a closing nut threaded on said cylinder and engaging said supporting element of said outer race of the upper bearing assembly.

3. The steering mechanism according to claim 1, wherein said outer race of each said bearing assembly is formed of two annular elements superimposed on each other and attached to another by a peripheral retaining band.

4. The steering mechanism according to claim 1, in which said annular, square cross-sectioned groove of each said bearing assembly is defined by two V-shaped throats positioned one against the other and said concentric inner and outer races are formed on the confronting surfaces and in which the surfaces of each of said throats are perpendicular therebetween and each inclined to 45° with respect to the axis of said respective race.

5. The steering mechanism according to claim 1, in which on each said bearing assembly there is mounted a dust shielding element.

6. The steering mechanism according to claim 1, in which said cylindrical rollers have a diameter greater than their height.

7. The steering mechanism according to claim 2 wherein the respective engaging surfaces of said closing nut and said supporting element are spherical.

* * * * *